United States Patent [19]

Dube et al.

[11] Patent Number: 5,045,506

[45] Date of Patent: Sep. 3, 1991

[54] PROCESS FOR PRODUCING MINERAL FIBERS INCORPORATING AN ALUMINA-CONTAINING RESIDUE FROM A METAL MELTING OPERATION AND FIBERS SO PRODUCED

[75] Inventors: Ghyslain Dube; Gaetan Chauvette, both of Jonquiere, Canada

[73] Assignee: Alcan International Limited, Montreal, Canada

[21] Appl. No.: 387,492

[22] Filed: Jul. 31, 1989

[51] Int. Cl.$^5$ .............................................. C03C 13/00
[52] U.S. Cl. ...................................... 501/35; 501/36; 501/95; 501/128; 501/155; 65/2; 65/19
[58] Field of Search .................. 501/155, 95, 36, 35, 501/128; 65/2, 19

[56] References Cited

U.S. PATENT DOCUMENTS

| | | | |
|---|---|---|---|
| 3,867,158 | 2/1975 | Hopkins . | |
| 4,365,984 | 12/1982 | Gee ................................... | 501/155 X |
| 4,818,289 | 4/1989 | Mäntymäki ....................... | 501/95 X |
| 4,822,388 | 4/1989 | Gee ........................................... | 65/2 |

FOREIGN PATENT DOCUMENTS

| | | |
|---|---|---|
| 0176497 | 9/1985 | European Pat. Off. . |
| 3543947 | 12/1985 | Fed. Rep. of Germany . |
| 8904813 | 6/1989 | PCT Int'l Appl. . |

OTHER PUBLICATIONS

Gillespie-CIM Bulletin of Jan. 1948, "The Manufacture of Mineral Wool".
Nafziger et al.-CIM Bulletin of Aug. 1976, "Electric Furnace Melting of By-Product Metallurgical Slags".
Vaillancourt-Le Quebec Industriel-May 1988-pp. 32, 33, "Cafco Fait Progresser L'Usage Du Four A Roc Electrique".
Industrial Minerals-Sep. 1986.
The Journal of the Canadian Ceramic-vol. 50, 1981.
Peacy-Canadian Meallurgical Quarterly-vol. 20, No. 2, pp. 241-245, 1981, "Mineral Wool Production from Copper Reverberatory Slag".

*Primary Examiner*—Karl Group
*Attorney, Agent, or Firm*—Cooper & Dunham

[57] ABSTRACT

A process for producing mineral fibers and the fibers thus produced are disclosed. The process involves forming a melt comprising an alumina-containing residue from a metal melting operation and one or more mineral raw materials suitable for forming mineral fibers, dividing the melt into streams and cooling the streams to produce the fibers. The residue from the metal melting operation acts as an inexpensive, substantially non-polluting source of alumina which can be used to increase the alumina content of the fibers and thus improve their properties, or which can be used as a replacement for more expensive or less desirable sources of alumina.

15 Claims, 2 Drawing Sheets

PROCESS FOR PRODUCING MINERAL FIBERS INCORPORATING AN ALUMINA-CONTAINING RESIDUE FROM A METAL MELTING OPERATION AND FIBERS SO PRODUCED

BACKGROUND OF THE INVENTION

I. Field of the Invention

This invention relates to the production of mineral fibers and to the fibers so produced.

II. Description of the Prior Art

Mineral fibers such as glass fibers, rock wool and ceramic fibers are used in large quantities for industrial and domestic purposes, primarily as heat insulating materials and, in the case of rock wool, for the production of acoustic tiles. The fibers derive their good heat and sound insulating properties from the relatively low conductivity of the fibers themselves and from the fact that their fibrous shapes result in the incorporation of large quantities of dead air spaces in the mass of material. The fibers are also attractive because of their resistance to high temperatures, fire, rot, attack by insects, and the like.

A critical consideration for these materials is their cost. To be attractive to potential users, the materials must be relatively inexpensive otherwise the payback period in terms of energy savings, when they are used as heat insulators, becomes unacceptably long. Mineral fibers are bulky and transportation costs make them expensive if they are transported over long distances; thus the industry generally consists of numerous small scale production facilities supplying their local areas. Such facilities are usually situated close to an inexpensive source of the raw material, e.g. a suitable rock deposit or a source of smelter slag from copper, lead or iron production furnaces.

While mineral fibers may contain a variety of metal oxides or other metal compounds, a main constituent is normally silica which has a relatively low melting point and can thus be easily drawn into fibrous shapes. In the case of glass fibers, silica is the precursor of the fibres (by definition) and therefore the only ingredient. Rock wool normally contains about 6–8 percent of alumina in addition to silica and other ingredients, and ceramic fibers may contain up to about 50 percent, (and sometimes up to 70 percent or more, of alumina with the remainder being mainly silica. It has been observed that the higher the alumina content, the higher is the melting point of the fibers and the more desirable are the physical properties of the fibers. Pure alumina, however, has a very high melting point (above 2200° C.) and is not itself useful for fiber formation. Alumina can of course be added to conventional raw materials in order to increase their alumina contents, but commercial grade alumina and bauxite are expensive. Consequently, alumina is not usually added to the raw materials for rock wool. Ceramic fibers, on the other hand, often use bauxite as a raw material together with glass sand, but the quantity of this material is usually kept as low as possible in order to keep down the cost, or kaolin clay (a mixture of 45–48% alumina and the remainder mainly silica) is used instead. Kaolin, however, usually contains iron and titanium impurities which can act as pollutants and reduce the refractoriness of the product.

There is accordingly a need for an inexpensive source of alumina for mineral fibers which can be used without making the fibers hazardous from the environmental point of view and which is not detrimental to the physical and chemical properties of the fibers.

SUMMARY OF THE INVENTION

The inventors of the present invention have unexpectedly found that alumina-containing residues from metal melting operations can be used as additives or replacements for conventional mineral fiber raw materials without introducing unacceptable pollution problems. The present invention is based on this finding.

According to one aspect of the present invention, there is provided a process for producing mineral fibers, which comprises producing a melt incorporating an alumina-containing residue from a metal melting operation and at least one other raw material suitable for forming mineral fibers, dividing the melt into individual streams, and cooling said streams to form said fibers.

According to another aspect of the invention, there are provided mineral fibers which incorporate an alumina-containing residue from a metal melting operation and at least one other mineral raw material suitable for forming mineral fibers.

By the term "alumina-containing residue from a metal melting operation" we mean any solid residue formed when aluminum or an aluminum-containing alloy is melted or when aluminum or an aluminum-containing alloy is used in a high temperature oxidation process to cause melting or reduction of other metals or materials (e.g. as in the aluminothermic process).

The residue should desirably be one which contains predominantly alumina, i.e. one having an alumina content of 50% or more by weight in the form of alumina itself or an alumina precursor which is converted to alumina during the formation of the melt. Thus the alumina concentrations of such materials mentioned in this disclosure should be understood to be expressed on a calcined basis.

The residue should also preferably have a low content of metallic aluminum or aluminum alloy, e.g. less than about 5% by weight, although it may be desirable to retain some aluminum in the residue for reasons that will be apparent later.

The "at least one other raw material suitable for forming mineral fibers" can be any conventional raw material used for mineral fibers or any other material of similar composition. Throughout the following disclosure, the at least one other raw material is referred to for the sake of simplicity as a conventional raw material.

The present invention has the advantage that residues from metal melting operations are inexpensive and indeed are usually discarded as waste, often at considerable expense. Thus the present invention provides a valuable use for an otherwise useless product as well as contributing to the improvement of mineral fibers.

DETAILED DESCRIPTION OF THE PREFERRED EMBODIMENTS

Figure 1:
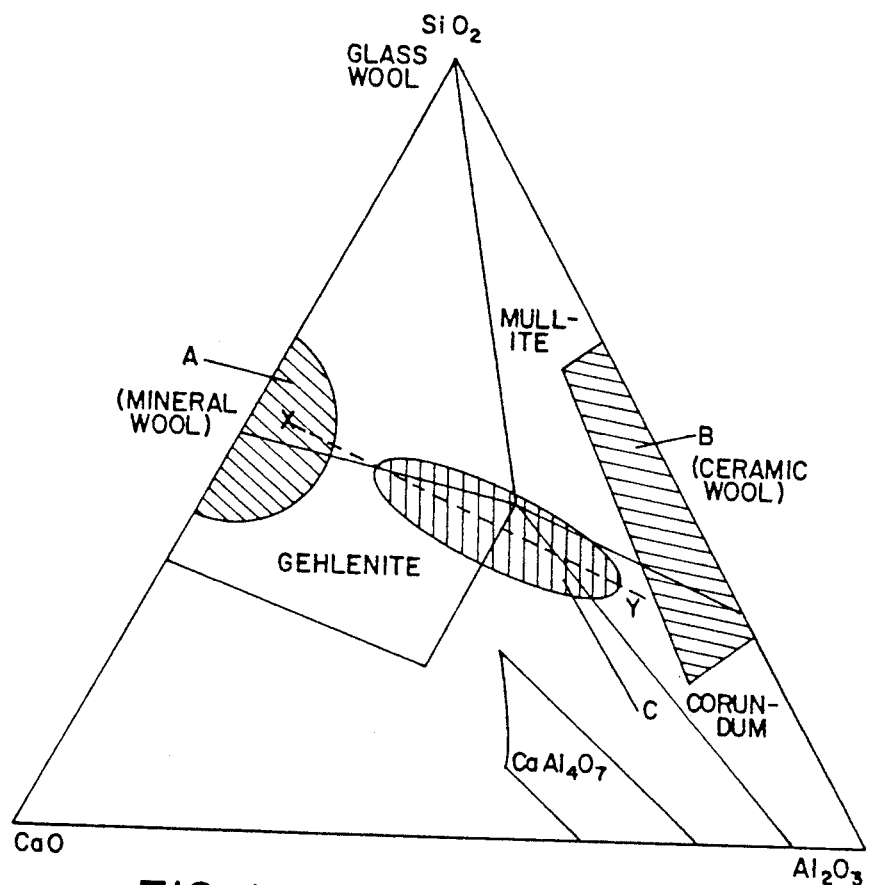
FIG. 1 is a simplified ternary phase equilibrium diagram for the system $SiO_2$-$CaO$-$Al_2O_3$ showing regions of interest to the present invention.

The preferred alumina-containing residues for use in the present invention are drosses resulting from the melting of aluminum and its alloys and aluminothermic slags resulting from commercial processes for making specialized metals (e.g. chromium) by the exothermic oxidation of aluminum powder.

Alumina dross is formed whenever aluminum or an aluminum alloy is melted in air or other oxidizing atmosphere and so it is obtained in large quantities in aluminum production and fabrication plants. The dross is normally treated to remove contained aluminum metal and the precise way in which the aluminum is removed affects the nature of the dross product and to a certain extent the way in which the dross should be treated before it is used in the present invention. For this reason, a description of dross treatment methods will be provided below.

First of all, aluminum-containing dross may be heated by a plasma torch while being tumbled in a rotating furnace according to the method described in our co-pending U.S. Pat. application Ser. No. 255,060 filed on Oct. 7, 1988, the disclosure of which is incorporated herein by reference. Molten droplets of the aluminum in the dross coalesce to form a continuous phase which can then be tapped off. In our prior patent application referred to above, steps are taken to operate the process in such a way that little or no aluminum or alumina in the dross is converted to aluminum nitride (which may occur if the plasma torch is operated with nitrogen gas under certain conditions). This is because aluminum nitride decomposes to alumina and ammonia gas when the treated dross is dumped in land fill sites, and ammonia is an unacceptable pollutant. We have now unexpectedly found that aluminum nitride is converted to alumina under the prevailing conditions when melted with raw materials for mineral fibers in a conventional melting furnace, even under a reducing atmosphere when it is believed that the nitride may reduce another oxide in the melt, e.g. iron oxide when present. For this reason, the plasma treatment of the dross can be carried out in such a way that aluminum nitride is formed in the dross when the product is to be used in the present invention. This means that the plasma torch can be operated with nitrogen as the carrier gas rather than more expensive gases such as argon.

A more conventional way of treating aluminum dross to remove contained aluminum is to heat the dross in a conventional furnace with a salt which reduces the surface tension of the molten aluminum and causes the aluminum droplets to coalesce. Disadvantageously, this produces a dross of high salt content which is polluting if discarded directly. Moreover, this salt-containing dross cannot be used directly for the process of the present invention because the salt content would be undesirable in mineral fibers and would leach out of the fibers to cause pollution. The dross should therefore first be subjected to a washing step with water in order to dissolve away the salt content. After washing, the dross contains hydrated alumina and should be heated to a temperature above at least 250 degrees centigrade for a sufficient time to remove chemically combined water. The dross may then be used in the process of the present invention as a source of alumina.

The dross produced by either of the above processes has a high alumina to silica ratio (the silica content, if any, usually amounts to just a few percent). The dross usually contains a minimum of 50 percent alumina (or alumina precursor) and generally at least 75 percent. The other components are generally CaO, silica and other refractory oxides. The dross may also contain magnesium oxide (in the form of spinel $MgAl_2O_4$) if it was formed on magnesium-containing aluminum alloys and this ingredient is also a useful additive for mineral fibers because it too enhances the refractory value of the fibers. However, if it is necessary to limit the magnesium content of the final fibers, a dross from a different alloy can be used as a complete or partial replacement for the magnesium-containing dross.

A particularly unexpected advantage of using alumina dross of the above types is that its addition to discoloured slags used as conventional raw materials results in a whitening of the final fibers and thus a more desirable product (e.g. acoustic boards made from the resulting fibers require fewer coats of paint to provide an acceptable appearance). This whitening effect appears to be greater than would be expected from a mere dilution of the original colour by the addition of a white or grey dross product. It is theorized that the dross contains a small residual amount of metallic aluminum and this reduces the iron oxides normally present in discoloured slag by the thermite process during the melting of the raw materials and precipitates metallic iron from the melt. In fact, blast furnace slags typically contain up to 5 percent iron oxide (and sometimes as much as 10 percent) and some of this is reduced during the conventional melting step (probably by carbon present in the slag), the iron being removed through a tap at the bottom of the furnace. It is believed that where iron is incompletely reduced, such that residual FeO remains, this oxide has a darkening effect on the end product. The addition of aluminum-containing dross seems to make this process more complete. Treated dross normally contains up to 5 percent aluminum, but more could be allowed to remain in order to produce a whiter product if the above whitening mechanism is correct. If desired, the percentage of residual aluminum could be matched to the amount of iron oxide in the raw material. In addition to the above-described effect, it is believed that the presence of dispersed fine alumina particles has a whitening effect on the end product.

As stated earlier, aluminum dross (particularly plasma treated dross) may contain aluminum nitride which does not act as a pollutant because of its conversion to aluminum oxide during the production of the melt with the conventional raw materials. Furthermore, other potential pollutants that the dross may contain, such as fluorides, appear to be encapsulated by the mineral structure of the fiber product (possibly by the silica content) and hence do not leach from the fibers, i.e. they appear to become bound to the mineral structure rather than remaining free. The dross can therefore be used without substantial risk of making the resulting fibers environmentally unsuitable. Dross generally contains very little iron (usually less than 1%), so the problems associated with this material are not introduced.

Aluminum dross, and especially plasma treated dross, is also a uniform powdery product which is manageable and easy to use in mechanical feeders and readily remelted in the electric arc furnace.

Another suitable source of aluminum dross suitable for use in the present invention is ball mill dust, i.e. the residue from the conventional ball milling operation of dross.

Aluminothermic slags, which are alternative sources of alumina for use in the present invention, are also well known and widely available products. In the case of chromium, the reaction proceeds as follows:

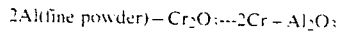

The resulting alumina slag contains a small proportion of chromium oxide. More details of the aluminothermic process can be obtained from standard works, e.g. D. Belitskus, J. of Metals, Jan. 1972, pages 30–34 and D. Belitskus, J. of Metals, May 1973, pages 39–44, the disclosures of which are incorporated herein by reference.

It is believed that these slags have not previously been suggested as additives for mineral fibers again because of the potential pollution problems. Depending on the metals which are produced by the aluminothermic procedure, the slags may contain chromium, vanadium, etc. or their respective oxides, as well as alumina. It is found that these potential pollutants are encapsulated by or bound to the mineral structure and thus do not leach out of the fibre product at a significant rate.

Whichever alumina-containing residue from a metal melting operation is employed in the present invention, it is added, preferably in fine powder form but generally in the form in which it is obtained, to a conventional raw material for mineral fibers either before the conventional raw material is melted for fiber production, while the raw material is being melted or after the raw material has already been melted.

The types of raw materials used for the production of mineral fibers are well known to persons skilled in the art and so detailed elaboration is believed to be unnecessary. However a general review of the materials and methods can be obtained from "Electric Furnace Melting of By-product Metallurgical Slags" by Nafziger and Tress, CIM Bulletin, August 1976, the disclosure of which is incorporated herein by reference.

The use of any amount of the alumina-containing residue to the conventional raw material is within the scope of the present invention but the preferred amounts depend upon the alumina content (if any) of the conventional raw material, the intended use of the fibre product and thermal resistance required, the percentage of alumina in the residue, the degree of whitening (if any) required, etc.

Generally, the amount of alumina should be such that the lower maximum temperature of the resulting melt is should remain within an acceptable range and the melt viscosity should remain low enough for fibre formation as is well known to those skilled in the art. Normally, the residue should form at least 5% of the melt, otherwise the process of the invention is not worthwhile because substantial improvements of the fibers and/or utilization of the residue are not obtained.

A particularly preferred form of the present invention involves the formation of fibers having an alumina content between that of conventional rock wool (5–8% by weight) and conventional ceramic fibers (around 50% by weight). These "intermediate fibers", which may have an alumina content of about 10–25%, preferably 10–20% and more preferably 10–15% by weight, have increased working temperatures (e.g. they may have limiting temperatures that are higher by 100° F. or more than the conventional 1250° F.) and improved physical properties. Intermediate fibers of this type can be formed by adding a residue from a metal melting operation to conventional blast furnace slags and the like traditionally used to form rock wool fibers. The actual amount of the residue added can easily be calculated when the alumina content of the residue and of the conventional raw material is known.

As noted above, ceramic fibers e.g. FIBERFRAX* and KAOWOOL*, usually contain about 50% alumina. By adding a residue from a metal melting operation, the alumina content can be increased up to about 90% and the limiting operational temperature in service can be increased from about 1500° C. to about 1750° C. Higher alumina contents, i.e. those approaching pure alumina, are difficult to obtain because the residue itself is not pure alumina and anyway, since the melting point of pure alumina is above 2200° C., the material becomes difficult to melt to form the fibers. Usually, the alumina content of a melt used to form ceramic fibers is increased up to 85%, more usually up to 80% and generally up to 75% by weight.

* Trade mark

In the case of ceramic fibers conventionally formed from bauxite and glass sand, the residue from the metal melting operation may replace some or all of the bauxite or may be added to the conventional bauxite/sand mixture to increase the alumina content as mentioned above.

In the case of ceramic fibers conventionally formed from kaolin, the residue from the metal melting operation may be added to the kaolin to increase the alumina content or the kaolin may be partially or completely replaced by an equivalent mixture of the residue and a source of silica.

The production of the melt of the conventional raw material and the alumina-containing residue can be carried out in a conventional melting furnace capable of producing a melting point high enough to melt the materials, of making the melt substantially homogeneous and of making the melt sufficiently fluid to form the desired fibers. A cupola furnace, or more preferably an electric melting furnace, can be employed and other suitable furnaces will be well known to persons skilled in the art. If desired, the materials may be melted by means of a high temperature plasma of the contained arc or transferred arc type. Similarly, the equipment used to form fibers from the melt produced in the furnace will also be well known and the fibers can be formed by the conventional methods of passing the melt through a perforated plate, directing a gas jet onto a stream of the melt or of allowing a stream of the melt to fall onto a rapidly spinning disk. Alternatively, it is possible to employ the procedure disclosed in "CAFCO fait progresser l'usage du four a arc electrique" by Pierre Vaillancourt, Le Quebec Industriel, May 1988, pp 32,33 (the disclosure of which is incorporated herein by reference). FIG. 1 shows the ternary phase equilibrium diagram for the system $SiO_2$-$CaO$-$Al_2O_3$. The typical compositions of conventional mineral wool fibres fall within zone A. The effect of adding alumina-containing materials is to move the composition along the line XY (zone C) to generate phases having higher thermal resistance. Such phases are typically comprised in ceramic wool compositions within the zone B.

The invention is described in more detail in the following Examples which are provided for illustration only and should not be construed as limiting the scope of the present invention.

EXAMPLE 1

Experimental Furnace

An experimental electric arc furnace of 50 lb. capacity operating at a voltage of 220 volts and at a current of 400 amps was used for this example.

A series of raw material mixtures were provided containing 5, 25 and 50% of aluminum dross from a plasma arc treatment thoroughly mixed with a conventional slag and silicate starting material for rock wool. The compositions of the dross, slag and silicate are shown in Tables 1 and 2 below.

TABLE 1

|  | SLAG | ST. FERDINAND SILICATE |
|---|---|---|
| $SiO_2$ | 39.20 | 89.00 |
| $Al_2O_3$ | 8.22 | 4.21 |
| $Fe_2O_3$ | 0.28 | 0.36 |
| MgO | 14.00 | 0.78 |
| CaO | 35.40 | 3.57 |
| PbO | 0.86 | — |
| $Na_2O$ | 0.32 | 0.95 |
| $K_2O$ | 0.43 | 1.87 |
| $TiO_2$ | 0.33 | — |
| $P_2O_5$ | 0.03 | — |

TABLE 2

|  | Dross residues from plasma treatment |
|---|---|
| Alumina $(Al_2O_3)$ | 15-25% |
| Spinel $(M_gAl_2O_4)$ | 30-40% |
| Aluminium nitride (AlN) | 30-35% |
| Other | 1-10% |
| Volatile fluorides | 175 ppm |

The mixtures were melted in the furnace and formed into mineral wool by a conventional technique. In all cases the dross residues incorporated well in the metallurgical slag and generated the thermally resistant phases already referred to above. Good quality fibres of light appearance were formed in all cases.

EXAMPLE 2

Production Level Test

This test was carried out in a conventional continuous slag melting furnace and fibre forming equipment.

Plasma treated alumina dross (5% by weight) was mixed with the conventional slag at the rate of 150 kg/h.

Twelve tons of improved quality fibres were produced and the following observations were noted.

1. In view of the size of the furnace, the inertia of the system requires a period of four hours before changes at the level of the raw material and the rock wool were noted.
2. The mineral wool became progressively whiter.
3. The temperature of the raw material at the exit of the furnace increased by 100° F. This increase of temperature was insufficient to decrease the life of the fibre-forming equipment.
4. The viscosity of the molten raw material decreased by 50%, partly due to the increase in temperature.
5. The consumption of electricity and the behaviour of the electrodes were the same as usual.
6. The production (expressed in tons per hour) remained very good during the period of the experiment.

Test Results

The fibers produced in the Examples above were subjected to the following tests.

(1) The mechanical properties of the fibers were subjected to the "Gaston" test developed by the Armstrong Research Laboratory (and patented in U.S. Pat. No. 3,222,924). This showed a value of 173 compared to a normal value of 164, indicating that the rock wool produced according to the invention posses excellent characteristics for their use in acoustic tiles.

(2) The "Environmental Protection Agency leach test" was carried out on the fibers produced as above. No trace (0 ppm) of fluorines was observed to leach from the fibers although the concentration of fluorines in the dross used to form the fibers was 175 ppm. Moreover, when the mineral fibers were held at 90° C. in a moist environment, no ammonia was generated as a result of the decomposition of aluminum nitride.

Figure 2:
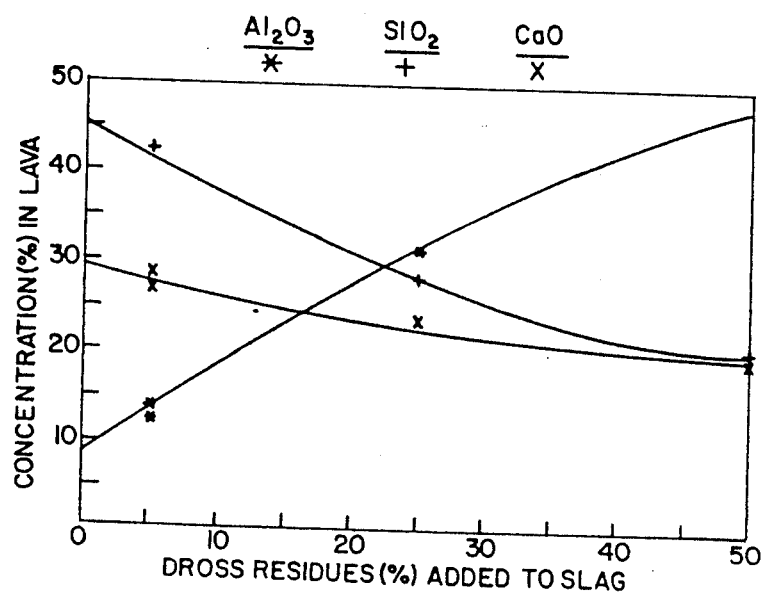
FIG. 2 is a graph showing the incorporation of dross residues into a slag melt.

(3) Chemical analysis by X-ray diffraction and by X-ray fluorescence spectroscopy of the mineral fibers showed that although the initial dross contained about 36% of aluminum nitride, this does not appear in the resulting fibers. The principal crystalline phases observed (see FIG. 1) were gehlenite $Ca_2Al_2SiO$- $(2CaOSiO_2Al_2O_3)$
calcium aluminum oxide $CaAl_4O$-$(Cao.2Al_2O_3)$
spinel $(MgO.Al_2O_3)$ (4) The incorporation of aluminium dross residues in the melt is shown in FIG. 2. The concentration of alumina in the melt increases linearly with the proportion of dross residues in the initial mixture. Also the concentration of silica decreases more rapidly that of calcium oxide. Those observations are in agreement with identified new crystalline phases containing mainly CaO and $Al_2O_3$. Dross residues react with metallurgical slag to create thermally resistant phases.

Figure 3:
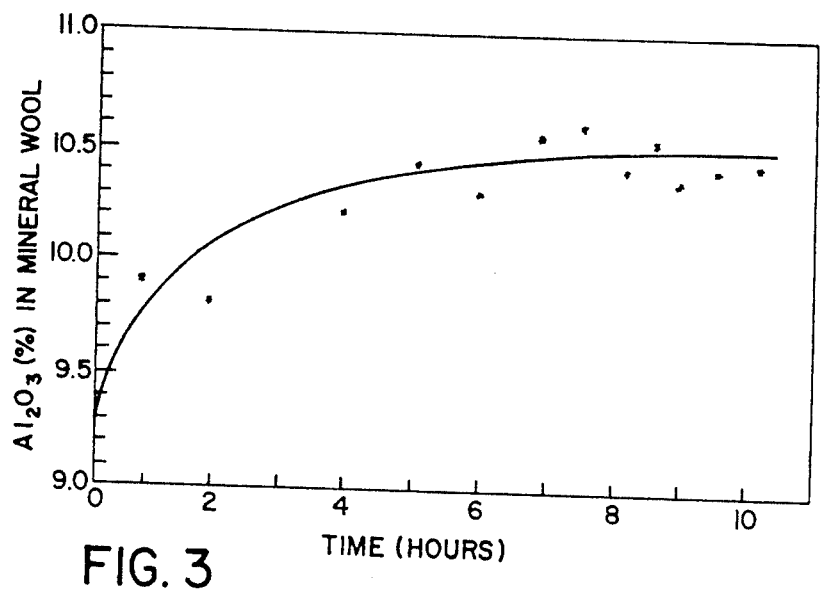
FIG. 3 is a graph showing the percentage of alumina in mineral wool during the addition of 5% dross residues.

The concentration of alumina in mineral wool during the addition of 5% dross residues is shown in FIG. 3. There is a gradual increase of alumina due to the dilution in the furnace. It was however sufficient to make the fibre whiter without changing normal operation parameters.

Figure 4:
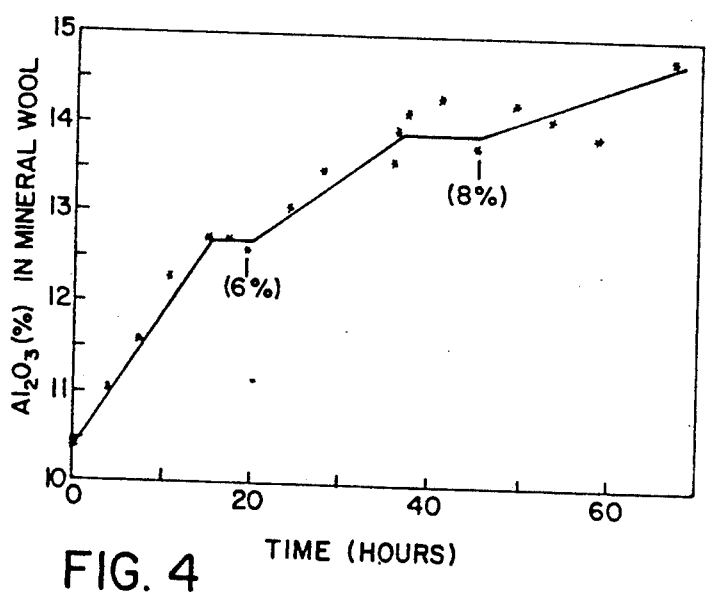
FIG. 4 is a graph showing the percentage of alumina in mineral wool during a production scale test.

A larger scale test was done starting the production with 2% dross residues added to slag. The furnace was then fed with 4% dross residues considered as initial time in FIG. 4. As dross residues proportion increase in the furnace, alumina content in the resulting mineral wool increases and the fibres became gradually whiter. White rock wool fibre is highly desirable for acoustic tile production.

What we claimed is:

1. A process for producing mineral fibers, which comprises producing a melt incorporating a residue from a metal melting operation containing at least 50% by weight of alumina on a calcined basis and at least one other raw material suitable for forming mineral fibers selected from the group consisting of metal melting slags, silica-containing rock, kaolin and mixtures of bauxite and glass sand, dividing the melt into individual streams, and cooling said streams to form said fibers.

2. A process according to claim 1 wherein said residue is a dross resulting from the melting of a metal selected from the group consisting of aluminum and alloys containing aluminum.

3. A process according to claim 2 wherein, prior to the production of said melt, a content of residual metal in said dross is reduced to less than about 5% by weight of said dross.

4. A process for producing mineral fibers, which comprises producing a melt incorporating an alumina-containing residue from a metal melting operation and at least one other raw material suitable for forming mineral fibers, dividing the melt into individual streams, and cooling said streams to form said fibers, wherein said residue is a dross resulting from the melting of a metal selected from the group consisting of aluminum and alloys containing aluminum and wherein, prior to the production of said melt, a content of residual metal in said dross is reduced to less than about 5% by weight of said dross by heating said dross with plasma while tumbling said dross in order to cause droplets of said metal to coalesce to form a continuous layer, followed by separating said continuous layer of metal from the residual dross.

5. A process according to claim 4 wherein a gas is employed for the generation of said plasma and said gas is selected from the group consisting of nitrogen and nitrogen-containing gases.

6. A process for producing mineral fibers, which comprises producing a melt incorporating an alumina-containing residue from a metal melting operation and at least one other raw material suitable for forming mineral fibers, dividing the melt into individual streams, and cooling said streams to form said fibers, wherein said residue is a dross resulting from the melting of a metal selected from the group consisting of aluminum and alloys containing aluminum and wherein, prior to the production of said melt, a content of residual metal in said dross is reduced to less than about 5% by weight of said dross and wherein the content of said residual metal is reduced by mixing said dross with a salt, heating the resulting mixture to cause droplets of said metal to coalesce to form a continuous layer, separating said continuous layer of metal, removing the salt from the residual dross by dissolving the salt in water, and then heating the remaining dross to convert any alumina hydrate to alumina.

7. A process according to claim 3 wherein said at least one other raw material contains an iron compound and wherein some residual metal is allowed to remain in said dross in order to cause the resulting fibers to have a lighter colour than fibers made from said at least one other raw material alone.

8. A process according to claim 1 wherein said residue is an aluminothermic slag.

9. A process according to claim 1 wherein said residue is ball mill dust.

10. A process according to claim 1 for the production of rock wool of increased alumina content which comprises employing as said at least one other raw material a mineral containing less than about 10% by weight of alumina and employing sufficient of said residue to increase the alumina content of said melt up to about 25% by weight.

11. A process according to claim 10 wherein said mineral has an alumina content of about 5-8% by weight and sufficient of said residue is employed to increase the alumina content of said melt to about 15-25% by weight.

12. A process according to claim 1 for the production of ceramic fibers wherein said at least one other raw material contains less than about 55% by weight of alumina and sufficient of said residue to is used to increase the alumina content of said melt up to about 85% by weight.

13. A process according to claim 12 wherein sufficient of said residue is employed to increase the alumina content of said melt up to about 75% by weight.

14. A process according to claim 1 wherein said melt contains at least 5% by weight of said residue.

15. A process according to claim 1 wherein said at least one other raw material is selected from the group consisting of metal smelting slags, silica-containing rock, kaolin and mixtures of bauxite and glass sand.

* * * * *